(12) United States Patent
Roth

(10) Patent No.: US 6,771,398 B2
(45) Date of Patent: Aug. 3, 2004

(54) DRUM SCANNER WITH LOADING MAGAZINE

(75) Inventor: Norbert Roth, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 660 days.

(21) Appl. No.: 09/815,199

(22) Filed: Mar. 22, 2001

(65) Prior Publication Data
US 2001/0030771 A1 Oct. 18, 2001

(30) Foreign Application Priority Data

Mar. 22, 2000 (DE) .......................................... 100 14 138

(51) Int. Cl.⁷ ................................................. H04N 1/04
(52) U.S. Cl. ..................................... 358/489; 358/493
(58) Field of Search ................................ 358/489, 493, 358/490, 491, 492, 471, 506, 505, 487, 474; 355/47; 399/369, 377, 378, 210; 382/312, 318, 319; 250/234–236

(56) References Cited

U.S. PATENT DOCUMENTS

| | | | | |
|---|---|---|---|---|
| 4,654,526 A | * | 3/1987 | Nakaji | 250/234 |
| 4,870,504 A | * | 9/1989 | Ishida et al. | 358/489 |
| 6,023,348 A | * | 2/2000 | Bosse et al. | 358/489 |

FOREIGN PATENT DOCUMENTS

| | | |
|---|---|---|
| DE | 36 05 463 C1 | 4/1987 |
| DE | 44 27 850 C2 | 2/1995 |
| EP | 0 270 011 A2 | 6/1988 |

* cited by examiner

Primary Examiner—Cheukfan Lee
(74) Attorney, Agent, or Firm—Laurence A. Greenberg; Werner H. Stemer; Ralph E. Locher

(57) ABSTRACT

In a combination of a drum scanner and a loading magazine, the drum scanner includes a holding and rotating device equipped for holding an interchangeable copy cylinder firmly from below in an at least approximately upright position and for rotating it about a longitudinal axis thereof for scanning. The loading magazine is constructed for containing a plurality n of magazine spaces equipped for holding copy cylinders in the same orientation and at the same height as on the holding and rotating device of the drum scanner, the n magazine spaces and the holding and rotating device being arranged at regular intervals around a cylinder transport carousel having n+1 outriggers extending in a star-shaped manner relative to the n magazine spaces and the holding and rotating device, and being equipped for lifting, together with the aid of the outriggers, copy cylinders located in the n magazine spaces and on the holding and rotating device, respectively, for moving them in a circle and for setting them down again at a desired location. The drum scanner and the loading magazine are subassemblies separably connected mechanically to one another by connecting elements with vibration-damping properties, and being, respectively, provided with at least one foot for bearing the weight virtually of the respective subassembly.

5 Claims, 6 Drawing Sheets

DRUM SCANNER WITH LOADING MAGAZINE

BACKGROUND OF THE INVENTION

Field of the Invention

The invention relates to a drum scanner with a loading magazine for copy cylinders.

The published European Patent Document EP 0 270 011 B1 describes a drum scanner wherein a number of copy cylinders with longitudinal axes disposed horizontally are placed in a loading magazine formed as an uprightly standing rotary disk. Each of the copy cylinders, respectively, is disposed in a scanning position wherein it is rotated at one end about the longitudinal axis thereof while a carriage bearing a scanning element is moved parallel to the axis of the copy cylinder. This drum scanner is able to scan a number of copy cylinders one after another automatically. In a further embodiment, a horizontally movable loading magazine from which, respectively, a copy cylinder can be removed by a robot arm and, after being rotated about a number of axes, can be set onto a holding and rotating device.

In the conventional drum scanner with a loading magazine, it is not possible for the operator of the drum scanner to place copy cylinders into the loading magazine or to remove them therefrom during the continuous scanning operation, because the effects of shocks on the loading magazine are transmitted to the copy cylinder then being scanned or to the sensing element, which can have a detrimental influence upon the scan result. In the heretofore known embodiment with a robot arm, although changing a magazine during continuous operation would be conceivable if the subassemblies are sufficiently stable and solid, the construction and the control of the robot arm are relatively expensive and complicated.

SUMMARY OF THE INVENTION

It is accordingly an object of the invention to provide a drum scanner and loading magazine combination which avoids the foregoing disadvantages of heretofore known constructions of this type.

With the foregoing and other objects in view, there is provided, in accordance with the invention, in combination, a drum scanner and a loading magazine, the drum scanner comprising a holding and rotating device equipped for holding an interchangeable copy cylinder firmly from below in an at least approximately upright position and for rotating it about a longitudinal axis thereof for scanning, and the loading magazine being constructed for containing a plurality n of magazine spaces equipped for holding copy cylinders in the same orientation and at the same height as on the holding and rotating device of the drum scanner, the n magazine spaces and the holding and rotating device being arranged at regular intervals around a cylinder transport carousel having n+1 outriggers extending in a star-shaped manner relative to the n magazine spaces and the holding and rotating device, and being equipped for lifting, together with the aid of the outriggers, copy cylinders located in the n magazine spaces and on the holding and rotating device, respectively, for moving them in a circle and for setting them down again at a desired location, the drum scanner and the loading magazine being separable subassemblies connected mechanically to one another by connecting elements with vibration-damping properties, and being, respectively, provided with at least one foot for bearing the weight virtually of the respective subassembly.

In accordance with another feature of the invention, the cylinder transport carousel is fixed to the drum scanner and is not in contact with the loading magazine in any position.

In accordance with a further feature of the invention, each magazine space includes an annular antenna having an axis coinciding with the longitudinal axis of a copy cylinder located in the magazine space, each of the copy cylinders having a transponder on the underside thereof wherein an electronic file name is stored which can be read out and rewritten via the antenna.

In accordance with an added feature of the invention, each of the copy cylinders bears a barcode as an optical file name, and the drum scanner includes a barcode reader equipped for reading the barcode from a respective copy cylinder rotating on the holding and rotating device, the electronic file name of the respective copy cylinders being normally identical with the optical file name thereof.

In accordance with a concomitant feature of the invention, the drum scanner and the loading magazine are equipped for accommodating and for processing copy cylinders with different diameters.

Thus, a drum scanner according to the invention includes a holding and rotating device which is equipped for holding an interchangeable copy cylinder firmly from below in an at least approximately upright position and for rotating it about its longitudinal axis for scanning. A loading magazine for the drum scanner contains a number n of magazine spaces which are equipped to hold copy cylinders in the same orientation and at the same height as on the holding and rotating device of the drum scanner. The n magazine spaces and the holding and rotating device are arranged at regular intervals around a cylinder transport carousel which has n+1 outriggers, which extend in a star shape in relation to the n magazine spaces and the holding and rotating device. The cylinder transport carousel is equipped for lifting copy cylinders, which are located in the n magazine spaces of the holding and rotating device, together with the aid of the outriggers, to move them in a circle and to set them down again at a desired location. The drum scanner and the loading magazine are subassemblies which can be separated from one another, are connected mechanically to one another by connecting elements with vibration-damping properties, and each of which is provided with one or more feet which essentially bear the weight of the respective subassembly.

The invention makes it possible for the operator of the drum scanner, during continuous scanning operation, to place copy cylinders into the loading magazine or to remove them therefrom. As noted hereinbefore, in a conventional drum scanner with a loading magazine, this is not possible, because the effects of shocks on the loading magazine are transmitted to the copy cylinder then being scanned or to the sensing element, which can have a detrimental influence upon the scan result. In the known embodiment with a robot arm, although changing a magazine during continuous operation would be conceivable if the subassemblies are sufficiently stable and solid, the construction and the control of the robot arm are relatively expensive and complicated.

Decoupling the vibrations of drum scanner and loading magazine according to the invention permits the changing of copy cylinders during production or continuous operation without requiring that the subassemblies be particularly stable or solid. The possibility of changing copy cylinders during production or continuous operation means that the operator can adapt the flow of work to the then current requirements, because he or she can change the copy cylinders at any time without having to wait until the drum scanner is at a standstill or is switched off. It is therefore possible for the working sequence to be configured very flexibly.

The vibration-damping connecting elements hold the two subassemblies at least approximately in the correct position in relation to one another. Shocks when changing copy cylinders in the loading magazine are not transmitted to the drum scanner, but are absorbed by the base upon which the loading magazine is supported. A cylinder or roller change is thereby possible at any time, at least if it is performed carefully. A careful roller change is made easier by the fact that the copy cylinders stand at least approximately upright and can be set in place from above.

The at least approximately upright position of the copy cylinders, both in the loading magazine and in the drum scanner, additionally makes it possible to use a cylinder transport carousel, which represents a considerably simpler transport device than the robot arm disclosed by the prior art. In order that the cylinder transport carousel may be able to fulfill its function without any risk that it will transmit shaking of the loading magazine to the drum scanner, it can be fixed either to the drum scanner or to the loading magazine, so as not to come into contact with the respective other subassembly in any position. In a preferred embodiment, the cylinder transport carousel is fixed to the drum scanner, specifically in the vicinity of a casting which forms a base for the holding and rotating device.

Because of the vibration-damping connecting elements, the drum scanner and the loading magazine can move a little relative to one another. The accuracy required for inserting a copy cylinder correctly into the drum scanner can, however, easily be achieved by guides and interrogation elements. Suitable as guides are, for example, tapered, i.e., self-centering, cylinder holders in the drum scanner or loading magazine, and suitable as interrogation elements are, for example, light barriers or sensors for registering the position of the cylinder transport carousel.

Although the vibration-damping connecting elements do not prevent the shocks occurring during a change of the copy cylinder in the drum scanner from getting into the drum scanner as well, this does not lead to any disruption, because changing the copy cylinder in the drum scanner can necessarily be performed only in the scanning pauses.

The construction as separate subassemblies offers the additional benefit that existing drum scanners can be retrofitted with the loading magazine without difficulty, and that the loading magazine can easily be disassembled again if it is not needed.

In conjunction with the possibility of being able to change copy cylinders at any time, it is moreover advantageous for each magazine space to contain an annular antenna having an axis which coincides with the longitudinal axis of a copy cylinder located in the magazine space, and each copy cylinder has a transponder, on the underside thereof, wherein an electronic file name is stored which can be read out and rewritten via the antenna.

The antenna at each magazine space makes it possible to identify all the copy cylinders stored in the loading magazine at any time. As a result, it is also possible, without difficulty, to remove any desired copy cylinder from the loading magazine at any time and to reinsert it. If, for example, a copy cylinder is removed from the loading magazine after a prescan (coarse scanning), this can be detected by the scanner control system, and a fine scan (fine scanning) is not performed until the scanner control system detects that the corresponding copy cylinder is again located in the loading magazine. In this regard, it does not matter at which magazine space the temporarily removed copy cylinder is replaced.

If any copy cylinder which has newly arrived is to be scanned first, it can be placed on any free magazine space and, if the loading magazine is full, it can be interchanged with any copy cylinder which has not yet been scanned or has been scanned only roughly. In order to scan the new copy cylinder, the current operating sequence is simply interrupted at a suitable location, and the new copy cylinder is transported into the rotating and holding device with the aid of the cylinder transport carousel, is scanned there and then conveyed back to a free magazine space. After that, the original operating sequence can immediately be resumed automatically. If the operator forgets to replace the temporarily removed copy cylinder in any magazine space, the scanner control system can draw attention thereto with a warning signal.

Copy cylinders for drum scanners normally have a hollow shaft, so that an identification device, like the transponder, cannot be fitted centrally. The annular antennas make it possible to read the code from such copy cylinders in any position in relation to a magazine space. As a result, it is neither necessary for the operator to pay attention to a specific angular position when inserting an copy cylinder, nor is it necessary to move the copy cylinder in any way in order to read the file name, as is necessary in the prior art.

The use of a freely programmable transponder makes it possible to retrofit existing drum scanner systems without a loading magazine, wherein each copy cylinder bears a barcode as an optical file name which is read optically in the rotating and holding device of the scanner, with a loading magazine without difficulty. The optical file name can remain the governing file name, even after the retrofit.

If the scanner control system determines, in the case of a copy cylinder located in the rotating and holding device, that the electronic file name thereof, which has previously been read in the loading magazine, does not agree with the optical file name, the copy cylinder is then transported to a free magazine space with the aid of the cylinder transport carousel, and is there provided with the appropriate electronic file name before it is processed further.

The transponders used, respectively, have a chip which stores the electronic file name and, preferably, further data such as features of the copy cylinder and/or comments. The electronic file name and, if necessary or desirable, further data can be read or rewritten via high-frequency signals from the antenna. The chip does not have its own power supply, but is supplied with power via the high-frequency energy which the antenna radiates.

The arrangement of the transponder according to the invention makes it possible to equip the holding and rotating device and the loading magazine in such a way that copy cylinders with different diameters can be processed.

Other features which are considered as characteristic for the invention are set forth in the appended claims.

Although the invention is illustrated and described herein as embodied in a drum scanner with loading magazine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
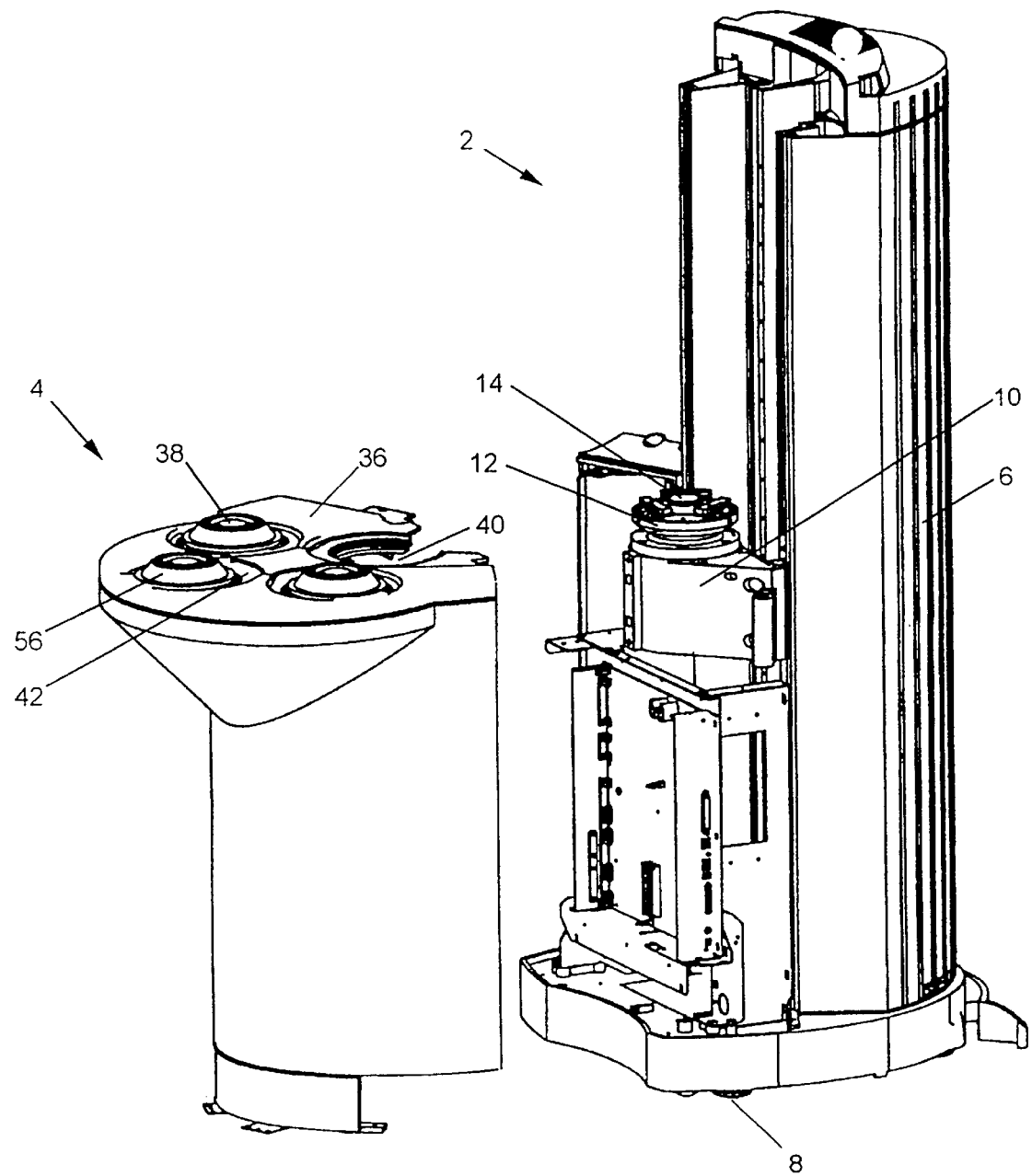
FIG. 1 is a perspective disassembled view of a drum scanner and a loading magazine therefor, according to the invention.

Referring now to the drawings and, first, particularly to FIG. 1 thereof, there is shown therein, in a perspective view, a drum scanner 2 and a loading magazine 4, which are disassembled and separated from one another.

Figure 2:
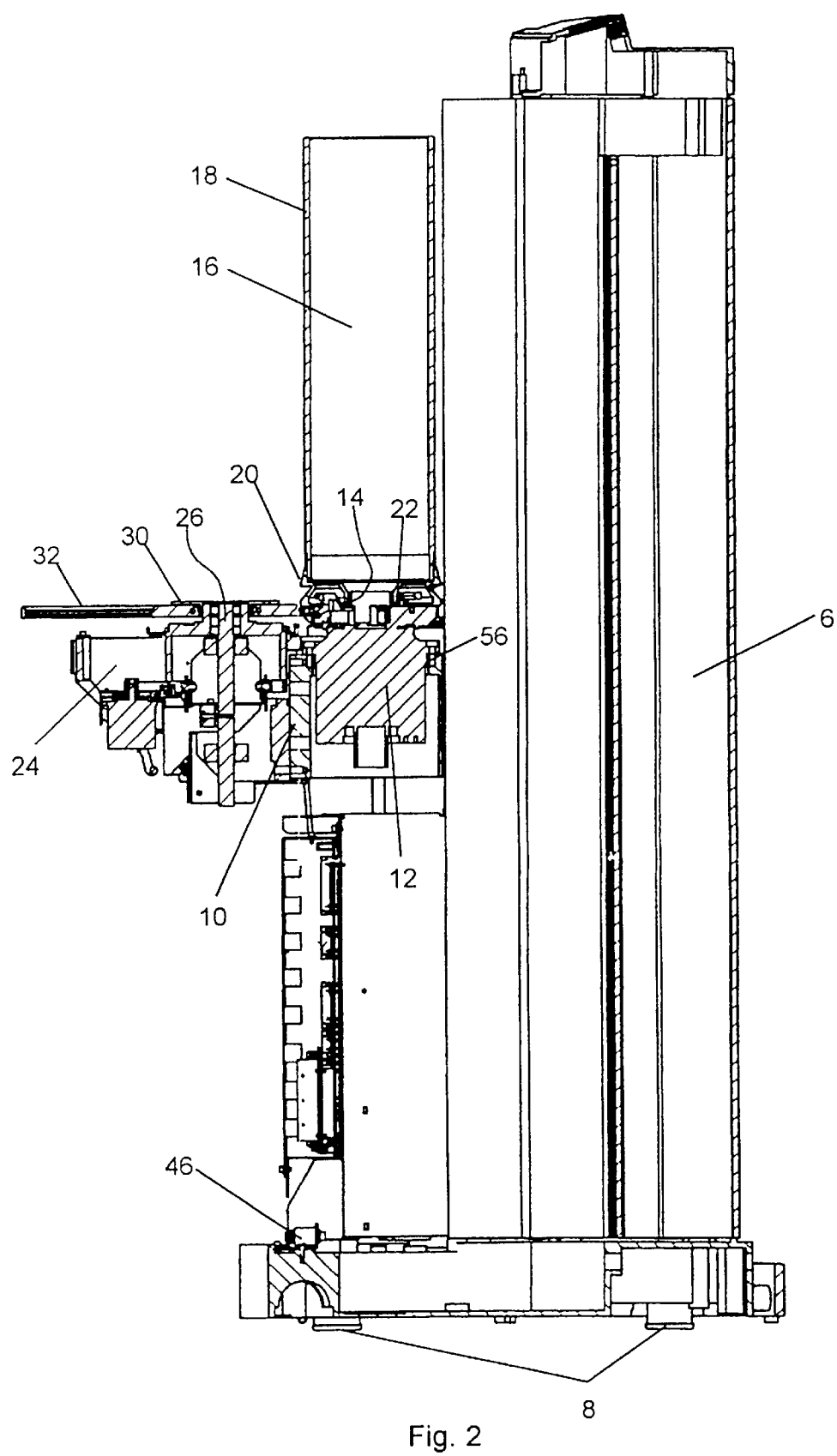
FIG. 2 is a vertical sectional view of the drum scanner of FIG. 1, with a copy cylinder provided therein.

The drum scanner 2 shown in detail in FIG. 2 has an elongated upright frame 6 with four feet 8 made of rubber or other vibration-damping material. At the front and approximately at the mid-height of the frame 6, there is a casting 10, wherein a spindle 12 having a vertical axis of rotation is rotatably mounted. The spindle 12 can be rotated by a non-illustrated electric motor and, at the upper end thereof, bears a cone 14 for forming a holding and rotating device for copy cylinders 16.

Each copy cylinder 16 has a hollow cylinder body 18 formed of transparent material which, at one end, is held in a metal flange 20. The flange 20 has a tubular extension 22 which extends axially with respect to the hollow cylinder 18. Formed in the extension 22 is an internal taper 50 (note FIG. 5), which fits onto the cone 14 on the spindle 12.

A copy cylinder 16 placed on the cone 14 of the spindle 12 assumes the upright position shown in FIG. 2. During operation, it is rotated about its axis by the spindle 12, while a non-illustrated optical sensing element, which is directed onto the outside of the copy cylinder 16, is moved parallel to the axis of the copy cylinder 16, in order to scan the copy cylinder 16 along circular or helical lines. The originals, which are adhesively bonded to the outside of the transparent hollow cylinder 18, can either be illuminated from outside (reflection scanning) or illuminated from inside by a light source at the end of a lance which is moved into the hollow cylinder 18 from above (transmission scanning). The scanning element, the illumination lance, a movable cover for the copy cylinder 16 and further constituent parts of the drum scanner 2 are not illustrated in the figures, in the interest of clarity.

The drum scanner 2 is able to accommodate copy cylinders 16 with various diameters, such as 150 mm and 212 mm diameters in this example.

Adhesively bonded to the outside of each copy cylinder 16, at a suitable location, is a barcode label, which bears a barcode as an optical file name. The drum scanner 2 has a non-illustrated barcode reader, which is able to read the barcode from a copy cylinder 16 when the latter is located in the drum scanner 2 and is rotating.

For operating the drum scanner 2 with the loading magazine 4, a cylinder transport carousel 24 (FIG. 2) is screwed onto the front side of the casting 10 wherein the spindle 12 is mounted. The cylinder transport carousel 24 has a stationary base, wherein a spindle 26 with a vertical axis of rotation is mounted, and also devices for rotating and for lifting and lowering the spindle 26, i.e., electric motors and force transmission elements, for example, gear wheels and cam disks, which are otherwise not illustrated in detail.

Fixed to the upper end of the spindle 26 is a rotary plate 30. The rotary plate 30 has four outriggers 32, which are arranged symmetrically around the spindle 26 and extend in a common horizontal plane. Each outrigger 32 includes an incompletely closed annular element which, on one side, has a gap and, on the other side, is fixed to the rotary plate 30. The internal diameter of each outrigger 32 is somewhat smaller than the diameter of the flange 20 of the smallest copy cylinder 16 that is used, so that the outrigger 32 can engage under the flange 20 of a copy cylinder 16 in order to lift it. Each outrigger 32 is fitted to the rotary plate 30 so that it can be folded upwardly and inwardly in order to mount and dismount, or assemble and disassemble, the loading magazine 4.

Figure 3:
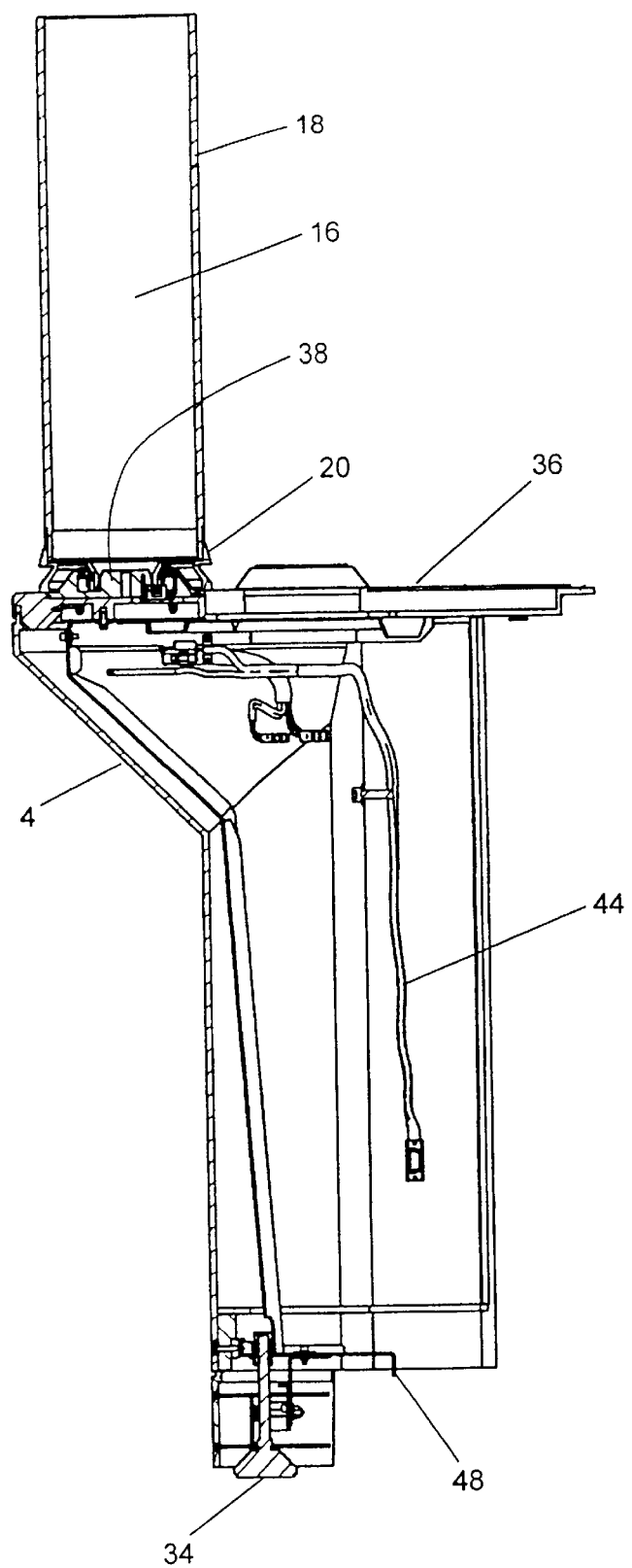
FIG. 3 is a vertical sectional view of the loading magazine of FIG. 1, with a copy cylinder provided therein.

As shown in FIGS. 1 and 3, the loading magazine 4 has a frame having one or more rubber feet 34. The top of the loading magazine 4 is an approximately circular table 36. In three of four positions which are distributed symmetrically around the center of the table 36, magazine spaces 38 are formed in the table 36, and a cutout 40 in the table 36 is formed in the fourth position. Each magazine space 38 is shaped so that a copy cylinder 16 placed therein from above is held upright and centered at the same time. In addition, each magazine space 38 is surrounded by an approximately annular trough 42, which has approximately the shape of an outrigger 32 on the rotary plate 30, but is somewhat larger in order to be able to accommodate the outrigger 32.

The table 36 or the three magazine spaces 38 therein are of such height that copy cylinders 16 (note FIG. 3, for example) located in the respective magazine spaces 38 are held at the same height as a copy cylinder 16 which is located on the spindle 12 of the drum scanner 2.

In order to mount the loading magazine 4 on or assemble it with the drum scanner 2, initially, the cylinder transport carousel 24 is screwed onto the casting 10 of the drum scanner 2. The outriggers 32 on the rotary plate 30 of the loading magazine 4 are folded up, and the loading magazine 4 is pushed horizontally against the drum scanner 2 and connected mechanically to the drum scanner 2 in a position wherein the spindle 12 of the drum scanner 2 is located in the cutout 40 in the table 36. At the same time, the three magazine spaces 38 of the loading magazine 4, and the spindle 12 of the drum scanner 2, are at exactly equal distances on the circumference of a circle around the axis of the cylinder transport carousel 24. The outriggers 32 are folded down again, so that they each extend into one of the annular troughs 42 (note FIG. 1). In addition, an electrical connecting cable 44 (note FIG. 3) from the loading magazine 4 is connected to the drum scanner 2. The connecting cable 44 is used for transferring data between the drum scanner 2 and the loading magazine 4. In addition, the connecting cable 44 includes a power supply cable for the loading magazine 4, which does not have its own power supply and is supplied with power by the drum scanner 2.

Figure 4:
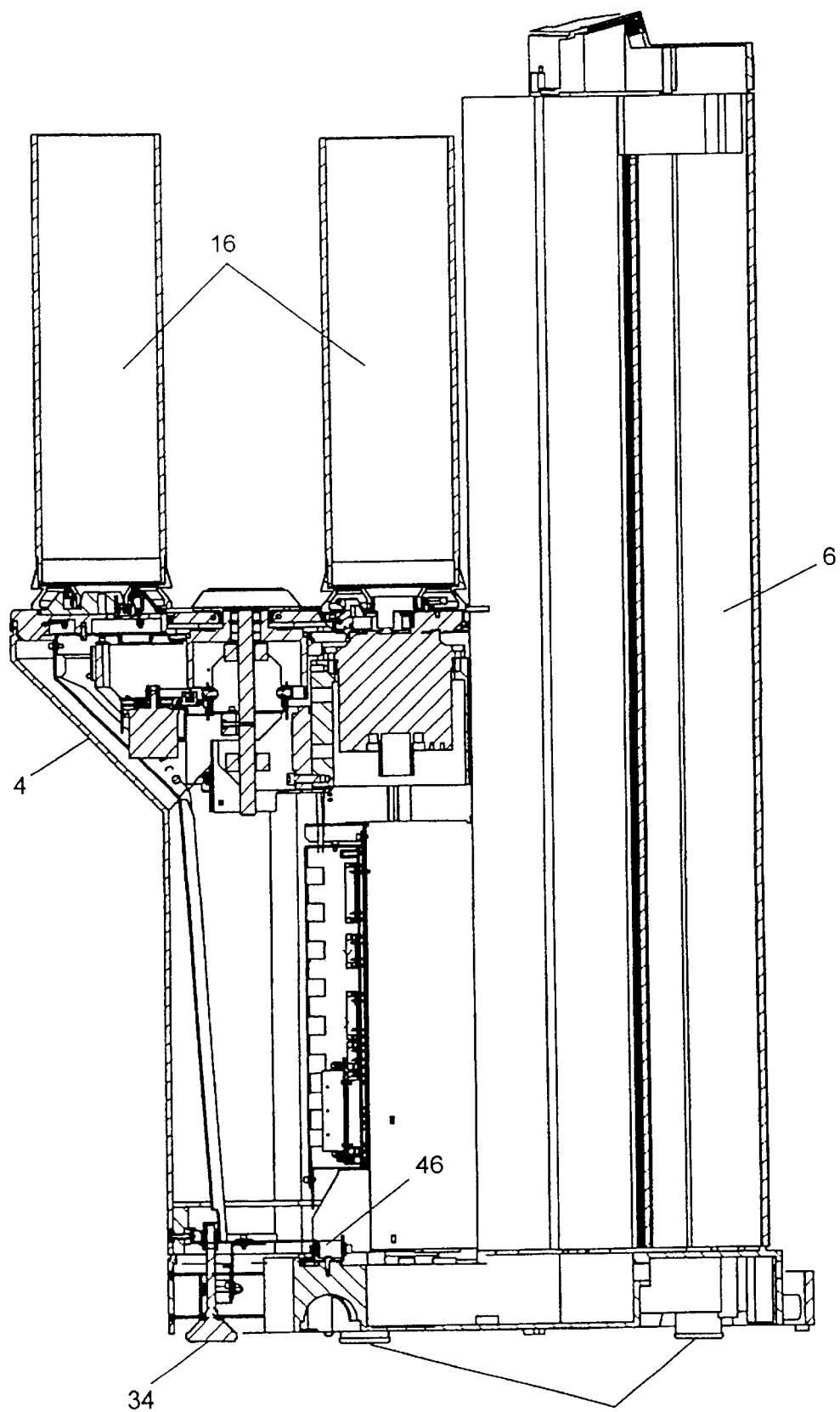
FIG. 4 is a vertical sectional view of the drum scanner and the loading magazine in assembled state.

FIG. 4 shows the drum scanner 2 and the loading magazine 4 in the assembled state and with copy cylinders 16 put in place. In this state, the outriggers 32 (seen only partially in FIG. 4), respectively, extend without contact into one of the annular troughs 42 (note FIG. 1) at the edge of each magazine space 38. The rotary plate 30 and the outriggers 32 thereof do not engage the table 36 of the loading magazine 4, either in the lifted or in the lowered position of the cylinder transport carousel 24. If the cylinder transport carousel 24 is lifted, then the outriggers 32 lift all the copy cylinders 16 which are in the drum scanner 2 or in the loading magazine 4. The cylinder transport carousel 24 can then be rotated 90° or a multiple thereof in order to remove a copy cylinder 16 automatically from the drum scanner 2 and transport a different copy cylinder 16, previously located in the loading magazine 4, into the drum scanner 2. If the cylinder transport carousel 24 is lowered again, the copy cylinders 16 are automatically centered on the cone 14 of the spindle 12 or on the magazine spaces 38. As a result, a given play or freedom is provided for the accuracy with which the relative position between the drum scanner 2 and the loading magazine 4 has to be maintained.

Because the drum scanner 2 and the loading magazine 4 only have to be positioned relative to one another with limited accuracy, it is possible to connect the loading magazine 4 to the drum scanner 2 via damping elements, i.e., connecting elements with vibration-damping properties, instead of rigidly. FIGS. 2 and 4 show such a damping element 46, which is located in the lower region of the drum scanner 2 and the loading magazine 4. The damping element 46 includes, for example, a rubber buffer which, at one end thereof, is fixed to the drum scanner 2 and, at the other end thereof, is fixed to a metal angle 48 (note FIG. 3) projecting from the loading magazine 4 when the loading magazine 4 is mounted on the drum scanner 2. In an upper region of the drum scanner 2 and the loading magazine 4, at locations 56 (note FIG. 2) on the lefthand and righthand sides of the casting 10, two further damping elements, which are not visible in the figures, are provided. These damping elements constitute the sole mechanical connection between the drum scanner 2 and the loading magazine 4, so that they are decoupled, in terms of vibration, from one another.

The damping elements 46 are constructed so as to be stiff enough for the relative position between the loading magazine 4 and the drum scanner 2 to be maintained with the necessary accuracy. In addition, the damping elements 46 are yieldable enough or sufficiently pliant so that any shaking of the loading magazine 4 caused by the operator is as much as possible not transferred to the drum scanner 2 but, via the rubber feet 34, largely absorbed by the base upon which the devices stand. This makes it possible to take copy cylinders 16 from the loading magazine 4 by hand or to fit the loading magazine 4 with copy cylinders 16 while scanning is taking place in the drum scanner 2. Without the damping elements 46, this would not be possible, because the scanning operation can be disrupted even by small shocks.

A non-illustrated mechanical or electronic interlock prevents the rotary plate 30 from being rotated in the lowered state, and the end positions of the "lifting" and "lowering" of the spindle 26, and the angular position of the rotary plate 30, are monitored by light barriers or sensors, which are likewise non-illustrated. In addition, a safety device is provided which ensures that the loading magazine 4 can be activated only when the drum scanner 2 is at a standstill and the cover is opened.

Figure 5:
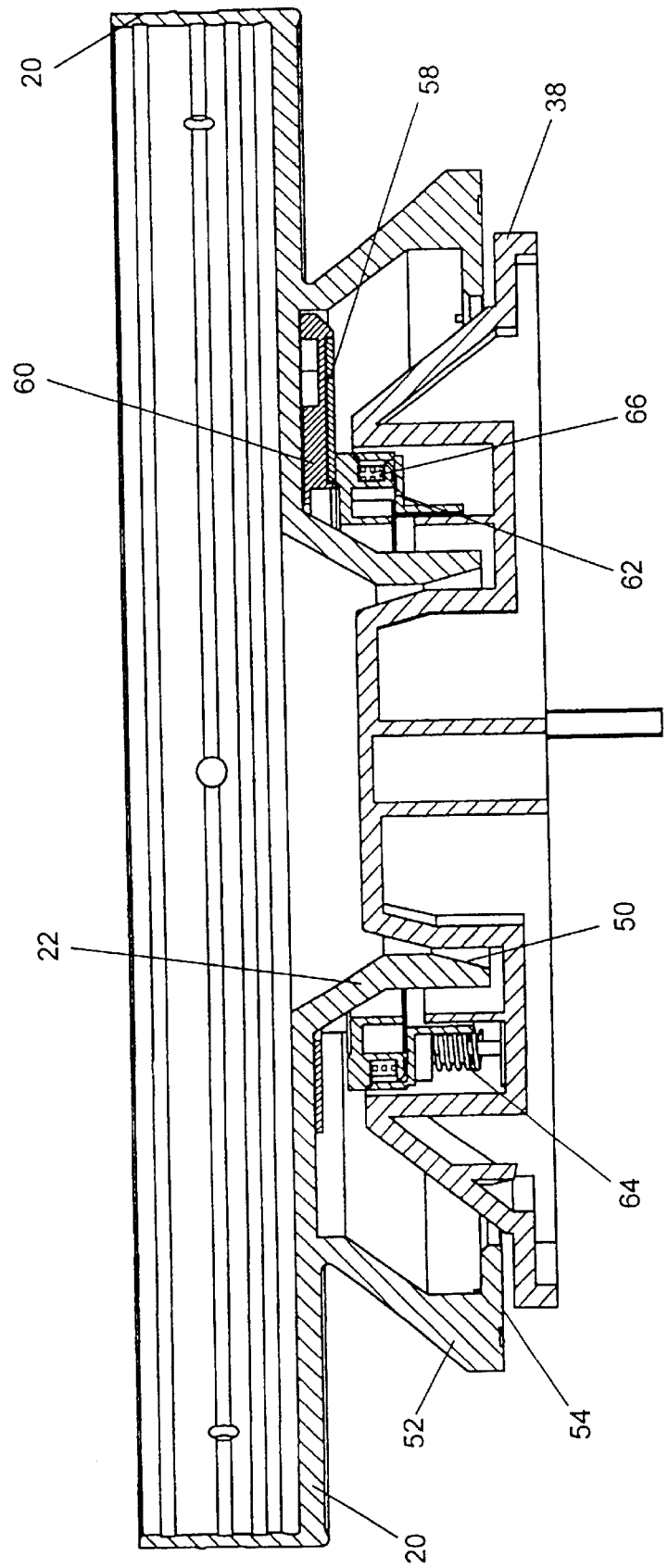
FIG. 5 is an enlarged fragmentary vertical sectional view of the loading magazine taken in the region of a magazine space wherein a copy cylinder is to be disposed.

FIG. 5 is a detailed sectional view of the table 36 of the loading magazine 4 in the region of a magazine space 38. A copy cylinder 16, of which only the lower flange 20 is shown in FIG. 5, is about to be placed on the table 36. The copy cylinder 16 shown in FIG. 5 is a copy cylinder with a larger diameter than the copy cylinder 16 of FIGS. 2 to 4. It is possible to see in FIG. 5 the tubular extension 22 on the flange 20, wherein the internal taper 50 is formed which fits onto the cone 14 of the spindle 12 in the drum scanner 2. To the bottom of the flange 20 of the copy cylinder 16, a ring 52 is also integrally molded, and has a greater diameter than that of the tubular extension 22 and, on the underside thereof, has an annular supporting face 54

At a location in the annular space between the tubular extension 22 and the integrally molded ring 52, a flat transponder 58 is seated in a holder 60 which is adhesively bonded to the flange 20. Fitted to the magazine space 38 is an annular coil unit 62 having a radius corresponding approximately to the distance of the transponder 58 from the axis of the copy cylinder 16. The coil unit 62 extends parallel to the table 36 and can be moved vertically a predetermined distance relative to the latter, being forced upwardly by a number of springs 64, of which only one is shown in FIG. 5. The coil unit 62 has an annular winding space 66 containing a wire winding.

When the copy cylinder 16 is placed into the magazine space 38, its dead weight presses the coil unit 62 downwardly counter to the force of the springs 64, so that the coil unit 62 bears on the transponder 58, as shown in FIG. 5.

The transponder 58 includes a freely programmable memory chip, wherein an electronic code and any further data can be stored, such as, for example, other identification features of the copy cylinder 16, or user-specific data, such as, comments, for example. This data can be read or rewritten with the aid of the coil unit 62. To this end, suitable high-frequency signals are applied to the wire winding of the coil unit 62. The wire winding of the coil unit 62 forms an antenna for transmitting the high-frequency signals to the transponder 58. The transponder 58 also obtains the power supply for the memory chip from the energy of the high-frequency signals. Suitable transponders can be obtained in the marketplace, for example, from the firms TEMIC, PHILIPS, TIRIS and EM MICROELECTRONIC-MARIN.

The circular shape of the coil unit 62, in conjunction with the defined distance between the transponder 58 and the coil unit 62, results in there always being good and defined electromagnetic coupling between the transponder 58 and the coil unit 62, regardless of the angular orientation of the copy cylinder 16 about the axis thereof, so that the data can be read or rewritten reliably in any position. This means that the instant a copy cylinder 16 is located in any magazine space 38 of the loading magazine 4, it can be identified at any time, and the data stored in the transponder 58 are also available for the acquisition of operating data.

Reading and writing the data stored in the transponder 58, regardless of position, is also possible when the annular coil unit 62 has a radius which is greater than the distance of the transponder 58 from the longitudinal axis of the copy cylinder 16, so that the transponder 58 is located within the radius of the coil unit 62, without making contact therewith, in any position of the copy cylinder 16.

The transponder 58 in each copy cylinder 16, and the coil unit 62 at each magazine space 38, permit the automatic detection or identification of copy cylinders 16 in the loading magazine 4. Identification can be carried out automatically and without any deliberate action by the operator. As a result, time-saving operating sequences are possible, wherein the operator has to be active at the scanner at significantly greater time intervals than hitherto, long time intervals remaining between phases of operator activity, wherein the operator can perform other activities. Nevertheless, the operator can change copy cylinders 16 in the loading magazine 4 at any time without incurring a risk of confusing the operating sequence. This results from the following description of details of the operation of the drum scanner 2 with loading magazine 4, and the description of a specific operating sequence for scanning a number of copy cylinders 16.

As described, the copy cylinders 16 have an optical file name in the form of a barcode label. This label is conventionally the governing code, which is read after the insertion of a copy cylinder 16 into the drum scanner 2. For this purpose, the copy cylinder 16 is rotated by an electric motor, and the barcode is therefore led past the barcode reader. By using the barcode, the scanner control system can identify the copy cylinder 16 before it carries out its scanning with associated parameters.

If the drum scanner 2 is expanded by the loading magazine 4, it permits identification of the additional electronic file number of the copy cylinder 16 automatically in the loading magazine 4, as well. In order to read the barcode label in the loading magazine 4, either the operator would have to be active, or complicated technical aids would be needed in order to rotate the copy cylinder 16 in the loading magazine 4 and, at the same time, to scan the barcode label.

This applies as well for other additional devices than the loading magazine 4, for example, copy mounting units. Additional devices of this type can likewise be provided with an annular coil unit 62 for reading the data in the transponders 58 or for writing data into the transponders 58 of copy cylinders 16. In this way, the copy cylinders 16 can also be identified in the context of operating pre-preparation or post-preparation, or within the context of the acquisition of operating data, even outside the drum scanner 2.

Because of the annular shape of the coil unit 62, the operator who places a copy cylinder 16 into the loading magazine 4 or another additional device does not have to take any notice of the position of the copy cylinder 16. Nevertheless, the transponder 58 may be located off-center on the copy cylinder 16. A central arrangement would not be possible, because the center of the flange 20 on the copy cylinder 16 is used as a guide.

In order that the use of the loading magazine 4 be compatible with conventional operating sequences, the barcode label is still used as the master, i.e., as the governing or decisive file name. The electronic file name is matched to the barcode. This means that, in a first step, the number which the barcode label bears is read into the transponder. This can be done, for example, by setting the appropriate copy cylinder 16 onto the loading magazine 4 by hand at any desired position. The copy cylinders 16 are then transported in any desired sequence, with the aid of the cylinder transport carousel 24, into the drum scanner 2, where the barcode label is read. In addition, the diameter of copy cylinders 16 in the loading magazine 4 or in the drum scanner 2 can be detected automatically, for example, by light barriers. If a copy cylinder 16 which the drum scanner 2 cannot process is mistakenly put into the loading magazine 4, an error message is produced at the latest when it is detected in the drum scanner 2.

The identified copy cylinder 16 is conveyed back to a free magazine space 38 where, with the aid of the coil unit 62, the same number as on the barcode label is written into the transponder 58. If the barcode label of a copy cylinder 16 is later changed for any reason, then the new barcode label will be detected at the latest during the next scanning of this copy cylinder 16, whereupon the transponder 58 will be corrected appropriately.

After all the copy cylinders 16 have been provided with an electronic file name, they can be loaded into the drum scanner 2 in agreement with a preprogrammed operating sequence. In this regard, the electronic file name and the barcode of each copy cylinder 16 are compared with one another once more. If they are identical, scanning is carried out, and if they are not identical, the copy cylinder 16 is taken out into the loading magazine 4 again, where its transponder 58 is rewritten.

After the processing of a given copy cylinder 16 in the drum scanner 2, the cylinder transport carousel 24 is used for exchanging the respective copy cylinder 16 for the next copy cylinder 16 which is to be scanned in accordance with the preprogrammed operating sequence. When the preprogrammed operating sequence has been completed, after the processing of a given copy cylinder 16, the operation of the drum scanner 2 is stopped and the operator is able to remove the processed copy cylinders 16 from the drum scanner 2 and/or the loading magazine 4.

A scanned copy cylinder 16 can be scanned once more at a later time, for example, with a higher resolution. The operator can also remove the copy cylinder 16 from the loading magazine 4 in the meantime, for example, in order to have a different copy cylinder 16 scanned in the interim. Subsequent reinsertion can in this case even take place at a different magazine space 38 than the original one. As a result, the operating sequence can be configured very flexibly.

For example, a number of copy cylinders 16 can initially be subjected to a prescan, by being conveyed after one another onto the holding and rotating device of the drum scanner 2 with the aid of the cylinder transport carousel 24 and, after the prescan, being conveyed back to a free magazine space 38 in the loading magazine 4. After the definition of the parameters for a fine scan of the copy cylinders 16 based upon the data obtained during the prescan, the copy cylinders 16 are subjected to fine scanning, by being conveyed one after another into the drum scanner 2 with the aid of the cylinder transport carousel 24, being scanned therein and subsequently being conveyed back to a free magazine space 38 in the loading magazine 4.

In the exemplary embodiment, a maximum of four copy cylinders 16 can be loaded, respectively, one copy cylinder 16 being directly accessible by the drum scanner 2. This arrangement is particularly beneficial with regard to so-called copix operation, wherein a color set of four individual color separations has to be scanned. Because four copy cylinders 16 with the individual color separations can be fitted together, the result is a particularly smooth operating sequence.

Figure 6A:
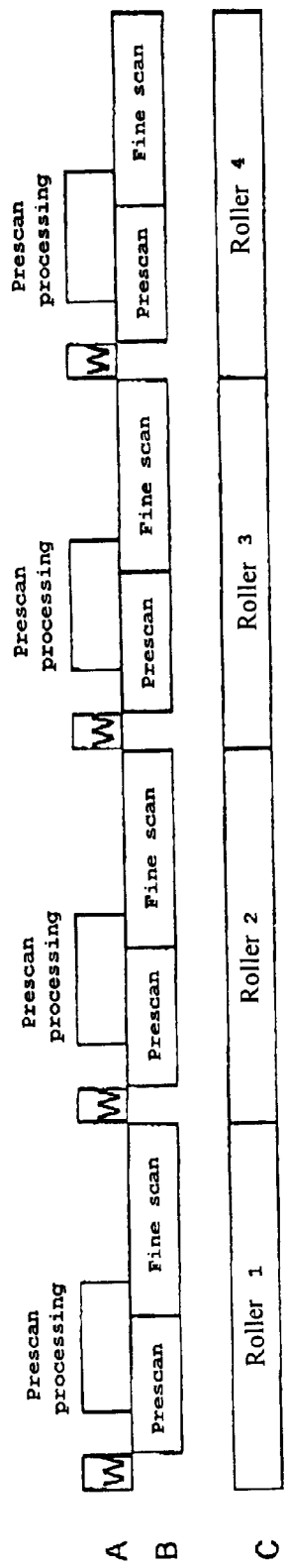
FIGS. 6a and 6b are timing diagrams for explaining examples of operating sequences on a drum scanner, FIG. 6a showing an operating sequence without a loading magazine and FIG. 6b showing a corresponding operating sequence with a loading magazine.
Figure 6B:
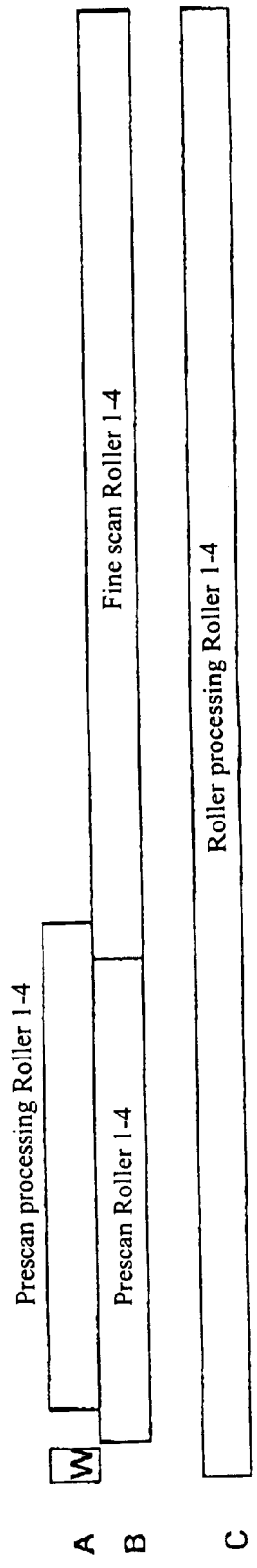

One example of such an operating sequence is shown in FIG. 6b, while FIG. 6a shows a corresponding operating sequence if no loading magazine 4 is used. FIGS. 6a and 6b are timing diagrams, the first line A of which, respectively, shows blocks representing time intervals during which the operator has to be active, namely for cylinder change W and for prescan processing. A second line B, respectively, shows blocks which represent time intervals during which the drum scanner 2 operates. A third line C indicates which of four cylinders is currently being processed.

In the operating sequence of FIG. 6b, the loading magazine 4 is activated automatically when the drum scanner 2 is switched on. The loading magazine 4 is filled by the operator of the workstation which controls the drum scanner 2 and the loading magazine 4. The operator places a copy cylinder 16, which is to be processed, in any desired magazine space 38. An electronic compartment interrogation system interrogates this magazine space 38 and reports the respective compartment occupancy to the workstation, the occupancy being detected, for example, by light barriers or sensors, as well as the electronic file name of the copy cylinder 16 which is read by the coil unit 62. The insertion and the changing, respectively, of a copy cylinder 16 can be detected either by the magazine spaces 38 being interrogated repeatedly at short intervals, or by a light barrier or a sensor which reports a change. The reported data are displayed on a monitor in the work station. In the monitor display, the operator can select a desired copy cylinder 16 and the file name thereof, respectively, whereupon this copy cylinder 16 is transported into the drum scanner 2 by the cylinder transport carousel 24, as described hereinabove, or is exchanged for a copy cylinder 16 already located in the drum scanner 2, and is subsequently scanned. After four cylinders have been inserted in this manner and have been subjected to a prescan, the operator having set the parameters for the fine scan on the monitor, all the fine scans are carried out automatically.

As can be seen from a comparison of FIGS. 6a and 6b, the overall time of the operating sequence is not reduced by the loading magazine 4. However, the activity of the operator in FIG. 6b is concentrated into a coherent time interval and, during the fine scan, he or she can, for example, operate a further scanner.

I claim:

1. In combination, a drum scanner and a loading magazine, the drum scanner comprising a holding and rotating device equipped for holding an interchangeable copy cylinder firmly from below in an at least approximately upright position and for rotating it about a longitudinal axis thereof for scanning, and the loading magazine being constructed for containing a plurality n of magazine spaces equipped for holding copy cylinders in the same orientation and at the same height as on said holding and rotating device of the drum scanner, said n magazine spaces and said holding and rotating device being arranged at regular intervals around a cylinder transport carousel having n+1 outriggers extending in a star-shaped manner relative to said n magazine spaces and said holding and rotating device, and being equipped for lifting, together with the aid of said outriggers, copy cylinders located in the n magazine spaces and on the holding and rotating device, respectively, for moving them in a circle and for setting them down again at a desired location, the drum scanner and the loading magazine being separable subassemblies connected mechanically to one another by connecting elements with vibration-damping properties, and being, respectively, provided with at least one foot for bearing the weight virtually of the respective subassembly.

2. The combination according to claim 1, wherein said cylinder transport carousel is fixed to the drum scanner and is not in contact with the loading magazine in any position.

3. The combination according to claim 1, wherein each magazine space includes an annular antenna having an axis coinciding with the longitudinal axis of a copy cylinder located in the magazine space, each of the copy cylinders having a transponder on the underside thereof wherein an electronic file name is stored which can be read out and rewritten via said antenna.

4. The combination according to claim 1, wherein each of the copy cylinders bears a barcode as an optical file name, and the drum scanner includes a barcode reader equipped for reading the barcode from a respective copy cylinder rotating on said holding and rotating device, the electronic file name of the respective copy cylinders being normally identical with the optical file name thereof.

5. The combination according to claim 1, wherein the drum scanner and the loading magazine are equipped for accommodating and for processing copy cylinders with different diameters.

* * * * *